(12) United States Patent
Hofmann et al.

(10) Patent No.: US 6,670,406 B2
(45) Date of Patent: Dec. 30, 2003

(54) PROCESS FOR PRODUCING POLYETHER POLYOLS

(75) Inventors: Jörg Hofmann, Krefeld (DE); Stephan Ehlers, Newtown Square, PA (US); Bernd Klinksiek, Bergisch Gladbach (DE); Bert Klesczewski, Düsseldorf (DE); Christian Steinlein, Ratingen (DE); Lars Obendorf, Köln (DE); Harald Pielartzik, Krefeld (DE); Jose F. Pazos, Havertown, PA (US)

(73) Assignees: Bayer Aktiengesellschaft, Lerverkusen (DE); Bayer Polymers LLC, Pittsburgh, PA (US)

( * ) Notice: Subject to any disclaimer, the term of this patent is extended or adjusted under 35 U.S.C. 154(b) by 132 days.

(21) Appl. No.: 10/077,855

(22) Filed: Feb. 19, 2002

(65) Prior Publication Data

US 2002/0198278 A1 Dec. 26, 2002

(30) Foreign Application Priority Data

Feb. 22, 2001 (DE) ......................... 101 08 485

(51) Int. Cl.$^7$ ..................... C07C 43/11; C08G 18/10
(52) U.S. Cl. ............. 521/170; 252/182.24; 252/182.27; 521/174; 568/613; 568/619; 568/620; 568/621
(58) Field of Search ................ 252/182.24, 182.27; 521/170, 174; 568/613, 619, 620, 621

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 4,533,254 A | 8/1985 | Cook et al. | 366/176 |
| 4,908,154 A * | 3/1990 | Cook et al. | 516/21 |
| 5,158,922 A | 10/1992 | Hinney et al. | 502/175 |
| 5,159,092 A | 10/1992 | Leuteritz | 554/149 |
| 5,482,908 A | 1/1996 | Le-Khac | 502/156 |
| 5,545,601 A | 8/1996 | Le-Khac | 502/156 |
| 5,627,120 A | 5/1997 | Le-Khac | 502/156 |
| 5,689,012 A | 11/1997 | Pazos et al. | 568/619 |
| 5,714,428 A | 2/1998 | Le-Khac | 502/159 |
| 5,777,177 A | 7/1998 | Pazos | 568/679 |
| 5,803,600 A | 9/1998 | Schubert et al. | 366/144 |
| 5,902,042 A | 5/1999 | Imaizumi et al. | 366/176.2 |
| 5,919,988 A | 7/1999 | Pazos et al. | 568/679 |
| 6,018,017 A | 1/2000 | Le-Khac | 528/421 |
| 6,180,728 B1 * | 1/2001 | Fanelli | 526/62 |
| 6,204,357 B1 | 3/2001 | Ooms et al. | 528/409 |
| 6,291,388 B1 | 9/2001 | Hofmann et al. | 502/154 |
| 6,323,375 B1 | 11/2001 | Hofmann et al. | 568/613 |

FOREIGN PATENT DOCUMENTS

| | | |
|---|---|---|
| CA | 2302984 | 9/2000 |
| DE | 198 42 383 | 3/2000 |
| DE | 199 24 672 | 11/2000 |
| DE | 199 28 156 | 12/2000 |
| EP | 050 312 | 4/1982 |
| EP | 0 654 302 | 5/1995 |
| EP | 853975 | 7/1998 |
| FR | 1181577 | 6/1959 |
| JP | 4-145123 | 5/1992 |
| WO | 99/19062 | 4/1999 |
| WO | 99/33562 | 7/1999 |

OTHER PUBLICATIONS

Kunststoffhandbuch, vol. 7, 3$^{rd}$ edition (month unavailable) 1993, pp. 193–252, Polyurethane Pur–Weichschaumstoff, Dr. Baatz, Dr. A Freitag, H. Grammes, Dr. H.W. Illger, Dr. H. Kleimann, Dr. H. Rabe, Dr. K. Recker, Dr. H. G. Schneider, R. Stoer, Dr. Ch. Weber, Dr. K.–D. Wolf.

Reaction Polymers, Polyurethanes, Epoxies, Unsaturated Polyesters, Phenolics, Special Monomers, and Additives, (month unavailable) 1992, pp. 47–96, Edited by Wilson F. Gum, Wolfram Riese and Henri Ulrich.

* cited by examiner

Primary Examiner—John M. Cooney, Jr.
(74) Attorney, Agent, or Firm—Joseph C. Gil; Lyndanne M. Whalen

(57) ABSTRACT

The present invention relates to a process for the production of a polyether polyol by polyaddition of an alkylene oxide onto a starter compound containing active hydrogen atoms conducted in the presence of a double metal cyanide catalyst comprising conducting a reaction mixture at least once through a zone which has an energy density of at least $5 \times 10^6$ J/m$^3$, wherein the dwell time of the reaction mixture in this zone is at least $10^{-6}$ seconds per pass.

11 Claims, 2 Drawing Sheets

PROCESS FOR PRODUCING POLYETHER POLYOLS

The invention relates to an improved process for producing polyether polyols in the presence of double-metal cyanide ("DMC") catalysts by polyaddition of alkylene oxides onto initiator compounds comprising active hydrogen atoms.

The production of polyether polyols is typically carried out industrially by polyaddition of alkylene oxides onto polyfunctional initiator compounds such as, for example, alcohols, acids or amines by means of base catalysis (e.g. KOH) (see, for example, Gum, Riese & Ulrich (Editors): 'Reaction Polymers', HanserVerlag, Munich, 1992, pp 75–96). After the polyaddition has finished, the basic catalyst has to be removed from the polyether polyol in a very elaborate process, e.g. by neutralization, distillation and filtration. The polyether polyols produced by a base-catalyzed method have the disadvantage, in addition, that with increasing chain-length the content of monofunctional polyethers with terminal double bonds (so-called "mono-ols") rises steadily and functionality falls.

The polyether polyols that are obtained can be employed for the production of polyurethanes (e.g. elastomers, foams, coatings), particularly for the production of polyurethane flexible foam materials. Flexible foam materials offer slight resistance to compressive stress, are open-celled, air-permeable and reversibly deformable. A distinction is made between slabstock foams and molded foams (see, for example, Kunststoffhandbuch, Vol. 7, $3^{rd}$ Edition, Hanser Verlag, Munich, 1993, pp 193–252). Slabstock foam materials are produced continuously or discontinuously as semi-finished products and are subsequently tailored to the dimension and contour corresponding to the application (e.g. upholstered furniture, mattresses). Molded foams, on the other hand, are produced by a discontinuous process in which the foam bodies are obtained directly in the desired shape (by foam expansion to fill out an appropriate mold).

DMC catalysts for the production of polyether are known. (See, for example, U.S. Pat. Nos. 3,404,109, 3,829,505, 3,941,849 and 5,158,922). The use of these DMC catalysts for the production of polyether polyols brings about a reduction in the proportion of monofunctional polyethers (mono-ols) in comparison with the conventional production of polyether polyols with basic catalysts. Improved DMC catalysts, such as are described in EP-A 700 949, EP-A 761 708, WO 97/40086, WO 98/16310, DE-A 197 45 120, DE-A 197 57 574 or DE-A 198 102 269, for example, additionally possess extraordinarily high activity and enable the production of polyether polyols at very low catalyst concentration (25 ppm or less), making separation of the catalyst from the polyol unnecessary.

In the course of producing polyurethane foams, in particular, polyurethane flexible foam materials, the polyether polyols that are obtained by DMC catalysis can lead to application problems, for example, destabilization of the foam (increased susceptibility to collapse) or increased coarse-cell structure. DMC-catalyzed polyether polyols, therefore, cannot replace corresponding base-catalyzed polyols in polyurethane flexible-foam applications in all cases without adaptation of the formulation.

It has now been found that polyether polyols that are produced completely or partially with DMC catalysis possess distinctly improved foaming properties in the course of the production of polyurethane foams if the polyether polyol is conducted through a suitable mixing unit during or after the DMC-catalyzed polyaddition of alkylene oxides onto initiator compounds comprising active hydrogen atoms.

The present invention relates to an improved process for producing polyether polyols, wherein the polyether polyol is produced completely or partially by DMC-catalyzed polyaddition of alkylene oxides onto initiator compounds comprising active hydrogen atoms and wherein the polyether polyol is conducted through a zone with high energy density during or after the DMC-catalyzed polyaddition. The present invention also relates to the use of the polyether polyols obtained in this way for the purpose of producing polyurethane foam, in particular polyurethane flexible foam materials.

The DMC catalysts suitable for the process according to the invention are known. See, for example, JP-A 04-145123, EP-A 654 302, EP-A 700 949, EP-A 743 093, EP-A 761 708, WO 97/40086, WO 98/16310, WO 99/19062, WO 99/19063, WO 99/33562, DE-A 198 34 572, 198 34 573,198 42 382, 198 42 383,199 05 611, 199 06 985,199 13 260, 199 20 937 or 199 24 672. A typical example is the highly active DMC catalyst described in EP-A 700 949, which, in addition to a DMC compound (e.g. zinc hexacyanocobaltate(III)) and an organic complex ligand (e.g. tert. butanol), also contains a polyether polyol with a number-average molecular weight greater then 500 g/mol.

Compounds with molecular weights from 18 to 2,000 g/mol, preferably, 62 to 1,000 g/mol, and 1 to 8, preferably, 2 to 6, hydroxyl groups are utilized as the initiator compounds having active hydrogen atoms. Examples of such initiator compounds useful in the present invention include butanol, ethylene glycol, diethylene glycol, triethylene glycol, 1,2-propylene glycol, 1,4-butanediol, 1,6-hexanediol, bisphenol A, trimethylolpropane, glycerin, pentaerythritol, sorbitol, raw sugar, degraded starch, water or so-called pre-lengthened initiators.

Alkylene oxides useful in the present invention include ethylene oxide, propylene oxide, butylene oxide and mixtures thereof. The synthesis of the polyether chains can be carried out with only one monomeric epoxide or randomly or blockwise with 2 or 3 different monomeric epoxides. Further details can be gathered from 'Ullmanns Encyclopädie der industriellen Chemie', Volume A21, 1992, 670 et. seq.

The polyaddition can be carried out by any alkoxylation process that is known for DMC catalysis.

For example, a conventional batch process can be employed. In this case, the DMC catalyst and the initiator compound are fed to the batch reactor, then the reactor is heated up to the desired temperature and a quantity of alkylene oxide sufficient for activating the catalyst is added. As soon as the catalyst has been activated, which becomes noticeable, for example, by a drop in pressure in the reactor, the remaining alkylene oxide is continuously added in metered amounts until the desired molecular weight of the polyether polyol is attained.

A continuous process may also be employed in which a pre-activated mixture composed of DMC catalyst and initiator compound is continuously supplied to a continuous reactor, e.g. to a continuous stirred-tank reactor ("CSTR") or a tubular reactor. Alkylene oxide is metered into the reactor, and the product is drawn off continuously.

In preferred embodiment of the present invention, DMC-catalyzed polyaddition is carried out in accordance with a process in which the initiator compound is added continuously in metered amounts during the polyaddition. In this regard, the DMC-catalyzed polyaddition with continuous metering of initiator can be effected by a batch process such as is taught by WO 97/29146, or by a continuous process, such as that disclosed in WO 98/03571.

The DMC-catalyzed polyaddition can be effected at pressures from 0.0001 to 20 bar, preferably, from 0.5 to 10 bar, more preferably, from 1 to 6 bar. The reaction temperatures are from to 20 to 200° C., preferably, 60 to 180° C., more preferably, 80 to 160° C.

The DMC catalyst concentration is generally from 0.0005 to 1 wt. %, preferably, 0.001 to 0.1 wt. %, more preferably, 0.001 to 0.01 wt. %, relative to the quantity of polyether polyol to be produced.

In accordance with the invention, the polyether polyol is conducted, during or after the DMC-catalyzed polyaddition, through a zone with high energy density, such as arises in a suitable mixing unit. The basic structure of suitable mixing units for the treatment according to the invention of the polyether polyols is described below.

Suitable mixing units are distinguished by the fact that, by reason of their geometry, they introduce a high local energy density into the product in the form of energy of flow. Since high pressures are frequently employed for this task, these mixing units are also designated as high-pressure homogenizers. Mixing units that are particularly suitable for such tasks are static mixers and/or nozzle units. Particularly suited are simple perforated screens, flat nozzles, jagged nozzles, knife-edge nozzles, microfluidizers, such as are described in U.S. Pat. No. 4,533,254 ("the '254 patent") which is incorporated herein by reference, microstructure mixers, microstructure components or jet dispersers. Further geometries that operate according to the same principle of these or other nozzle units are readily available to a person skilled in the art. The functional principle of these nozzle units will be explained on the basis of the example represented by a simple perforated screen. The stream of product is pressurized by a pump and expanded through the orifice. By reason of the sudden constriction of cross-section, the stream of product in the nozzle is greatly accelerated. Depending on the geometry of the orifice, two different kinds of force may act on the product in this process. Either the stream of product is accelerated so much that the flow in the nozzle is turbulent, or, in the case of a laminar flow, a so-called extensional flow forms in the nozzle.

BRIEF DESCRIPTION OF DRAWINGS

Examples of suitable nozzle units are represented in FIGS. 1 to 5.

Figure 1:
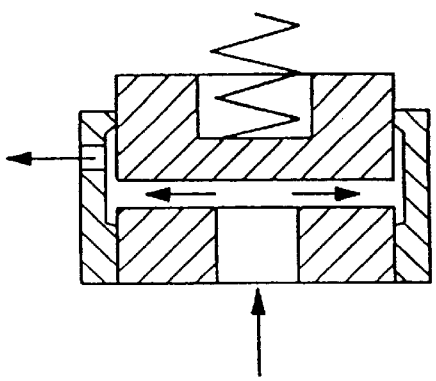
FIG. 1 shows a flat nozzle. A knife-edge nozzle is represented in FIG. 2. A microfluidizer is reproduced in FIG. 3. A jagged nozzle is illustrated in FIG. 4, and a jet disperser is shown in FIG. 5.
Figure 2:
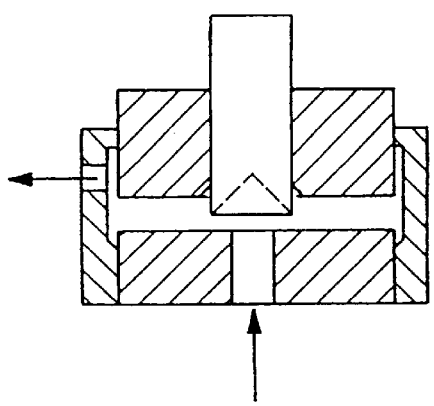
Figure 3:
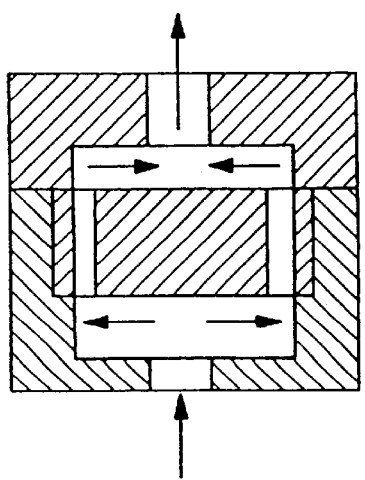
Figure 4:
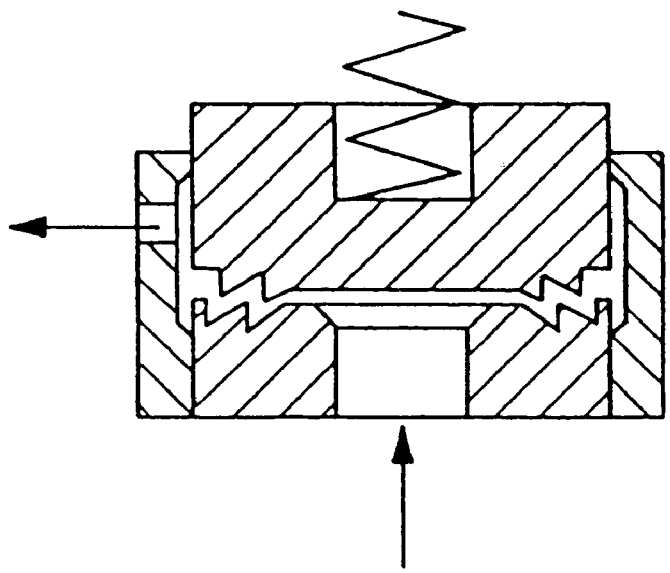
Figure 5:
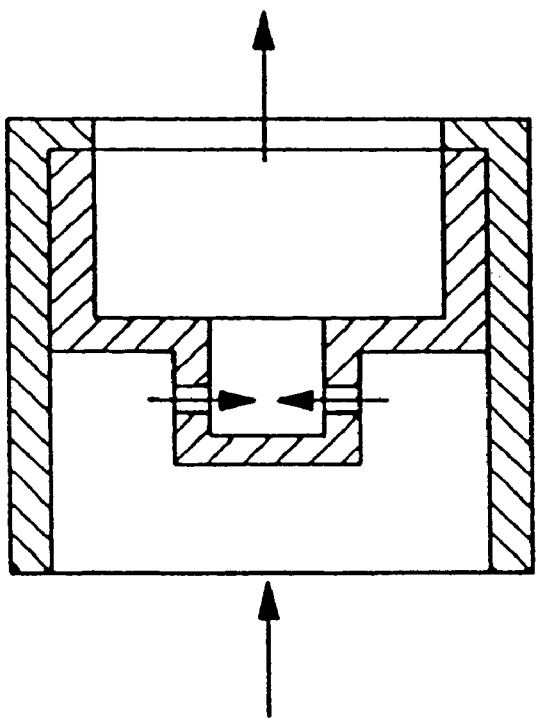

In addition to these mixing units, which introduce a high energy density into the product in the form of energy of flow, apparatus that introduce a high energy density by virtue of their rotating parts are also suitable. Examples of such rotating parts include rotor-stator systems, ball mills, colloid mills, wet-rotor mills, toothed-ring dispersing machines, intensive mixers, which employ the principle of the toothed-ring dispersing machines but are flowed through in the axial direction, or other apparatus employing rotating parts which are readily available to a person skilled in the art and can be employed for the purpose of the present invention.

Furthermore, mixing units which generate high energy densities by cavitation, as do, for example, ultrasound disintegrators, might also be used in the present invention. The term "cavitation" is understood to mean the formation and collapsing of vapor bubbles in a liquid in which an isothermal drop in pressure first takes place to the vapor pressure of the liquid and the pressure subsequently rises again. As a result of the rise in pressure, the gas bubbles that have formed collapse again. The comminution-effective energy is released in the course of the collapsing process. As a result of addition of a liquid with a suitable vapor pressure, in the case of polyethers, the necessary energy density can therefore be attained.

Combinations of the stated or similar mixing units may also be employed.

Crucial factors in the process according to the invention, irrespective of the type of mixing units used, are the magnitude of the energy density introduced into the product and the dwell-time of the product in the range of high energy densities. It has been shown that the foaming properties of the polyether polyols obtained by virtue of the process according to the invention are only improved when certain minimum values of energy density and total dwell-time (product of dwell-time per transit and number of transits) in the mixing unit are met.

In the case of the nozzle units, the energy density $E_v$ is determined by the pressure difference (homogenizing pressure) $\Delta p_H$ that is effective at the nozzle. This is represented by the following formula:

$$E_v[J/m^3] = \Delta p_H$$

For mixing units that operate in accordance with the principle of the rotor-stator systems, the energy density can be calculated experimentally from the power P introduced, the density $\rho$, the effective dispersing volume $V_{sp}$ and the dwell-time t in said volume as follows:

$$E_v[J/m^3] = P \times \rho^{-1} \times V_{sp}^{-1} \times t$$

According to the invention, energy densities of at least $5 \times 10^6$ J/m$^3$, preferably, at least $7.5 \times 10^6$ J/m$^3$, more preferably, at least $1 \times 10^7$ J/m$^3$, are used. The dwell-time of the product in the appropriate zones with high energy densities should amount to at least $1 \times 10^{-6}$ seconds, preferably, $1 \times 10^{-5}$ to 1 second. The polyol is sent 1 to 1,000, preferably, 1 to 100, more preferably, 1 to 20 times through at least one zone with high energy density.

In addition to the use of the mixing units described above, the effect according to the invention can also be obtained by generating a purely turbulent flow. These flows can be characterized more easily by the shear forces that arise than by the energy densities. Shear forces and energy densities can, however, be converted into one another. The shear forces are defined as: $F_{sh}$: shear forces $$F_{sh} = \frac{\bar{v}}{r}$$

$\bar{v}$: mean speed
r: characteristic radius.

According to the invention, shear-rates of at least $5 \times 10^4$ sec$^{-1}$, preferably, at least $1 \times 10^5$ sec$^{-1}$, more preferably, at least $5 \times 10^5$ sec$^{-1}$, are used. The dwell-time of the product in the appropriate zone(s) with such shear-rate(s) should amount to at least $1 \times 10^{-6}$ seconds.

The treatment of the polyether polyol with the mixing unit can be conducted, during the DMC-catalyzed polyaddition or directly after the polyaddition, through one of the units described above, e.g. in a forced-circulation circuit directly connected to the reaction vessel or in the pipeline emanating from the vessel. In the case of a continuous process, the treatment of the polyether polyol can also be carried out during the secondary reaction, e.g. in the case of a multistage process—i.e. a process employing several reaction vessels—in the forced-circulation circuit of a reactor connected to the alkoxylation stage. Suitable mixing units may likewise be installed in connecting pipelines, such as, for example, in the feed lines leading to a storage tank, in connecting lines between various reactors or also in tubular reactors. Furthermore, a treatment of the polyether after the DMC-catalyzed polyaddition, i.e. during storage, for example, is also possible by forced circulation or by a separate after-treatment independently of the production process in a separate apparatus suitable for this purpose.

Treatment of the polyether polyol with the mixing unit is effected, in general, at temperatures from 20 to 200° C., preferably, 30 to 180° C., more preferably, 40 to 160° C.

In the process according to the invention, the polyether polyol is produced completely or partially by DMC-catalyzed polyaddition of alkylene oxides onto initiator compounds comprising active hydrogen atoms.

In the case of partial production of the polyether polyol with a DMC catalyst, any arbitrary alternative (acidic, basic or coordinative) catalyst may be employed with a view to further synthesis of the polyether polyol.

In the case of a conventional batch process, it is advantageous, for example, to employ oligomeric alkoxylation products with number-average molecular weights from 200 to 2,000 g/mol by way of initiator compounds for the DMC catalysis. These alkoxylation products may be produced by alkoxylation of low-molecular initiator compounds, such as 1,2-propylene glycol or glycerin, for example, by means of conventional base catalysis (e.g. KOH) or acid catalysis.

The so-called EO cap, in which, for example, poly (oxypropylene) polyols or poly(oxypropylene/oxyethylene) polyols are converted with ethylene oxide in order to transform the predominant portion of the secondary OH groups of the polyether polyol into primary OH groups, is also preferably carried out with base catalysis (e.g. KOH).

Production of the polyether polyols is preferably effected in the process according to the invention to a proportion amounting to at least 20%, more preferably at least 40%(in each case relative to the quantities of the alkylene oxide employed for producing the polyether polyol), with DMC catalysis.

The polyether polyols that are produced by the process according to the invention possess distinctly improved foaming properties in the course of the production of polyurethane flexible foam materials.

EXAMPLES

Production of the Polyether Polyols

Polyol A (Comparison):

Polyol A is a nominally trifunctional polyether polyol with a molar mass of 3,000 g/mol which was obtained by conversion of glycerin with propylene oxide with KOH catalysis (0.41 wt. %, relative to the quantity of the finished polyether polyol) at 107° C. and subsequent separation of the catalyst by neutralization with sulfuric acid, dehydration and filtration.

Polyol B (Comparison):

Polyol B is a nominally trifunctional polyether polyol with a molar mass of 3,000 g/mol which was obtained at 130° C. by conversion of glycerin with propylene oxide subject to continuous metering of the initiator compound with DMC catalysis (30 ppm, relative to the quantity of the finished polyether polyol, of a zinc hexacyanocobaltate DMC catalyst which contains as ligands tert. butanol and a poly(oxypropylene)diol obtained by DMC catalysis with a number-average molecular weight of 4,000 g/mol, described in EP-A 700 949, Example 1).

Polyol C

Polyol C was obtained from Polyol B by treatment according to the invention with a jet disperser. To this end, Polyol B was submitted in a receiving container capable of being temperature-controlled and then pumped into a second container at a temperature of 60° C. by means of a diaphragm piston pump through a jet disperser (1 bore with diameter 0.2 mm) with a mass flux of 16 l/h. The drop in pressure at the jet disperser amounted to 500 bar, corresponding to an energy density of $5 \times 10^7$ J/m$^3$.

Polyol D (Comparison):

Polyol D is a nominally hexafunctional polyether polyol with a molar mass of 12,000 g/mol which was obtained by conversion of sorbitol with propylene oxide at 107° C. up to a molar mass of 9,900 g/mol and then with ethylene oxide at 120° C. up to a molar mass of 12,000 g/mol with KOH catalysis (0.46 wt. %, relative to the quantity of the finished polyether polyol) and subsequent separation of the catalyst by neutralization with sulfuric acid, dehydration and filtration.

Polyol E (Comparison):

Polyol E is a nominally hexafunctional polyether polyol with a molar mass of 12,000 g/mol. With a view to producing Polyol E, first a hexafunctional sorbitol-initiated poly (oxypropylene) polyol with a molar mass of 1,680 g/mol (produced by means of KOH catalysis) was lengthened by conversion with propylene oxide with DMC catalysis (30 ppm, relative to the quantity of the intermediate stage with a molar mass of 9,900 g/mol, of the DMC catalysts described in connection with the production of Polyol B) at 130° C. up to a molar mass of 9,900 g/mol, and then Polyol E with a molar mass of 12,000 g/mol was obtained by conversion with ethylene oxide with KOH catalysis (0.4 wt. %, relative to the quantity of the finished polyether polyol) at 125° C. The basic catalyst was separated by treatment with magnesium silicate (MAGNESOL™, Hoechst AG).

Polyol F:

Polyol F was obtained from Polyol E (Comparison) by treatment according to the invention with a jet disperser. To this end, Polyol E was submitted in a receiving container capable of being temperature-controlled and then pumped into a second container at a temperature of 60° C. with a diaphragm piston pump through a jet disperser (2 bores with diameter 0.5 mm) with a mass flux of 180 l/h. The drop in pressure at the jet disperser amounted to 200 bar, corresponding to an energy density of $2 \times 10^7$ J/m$^3$. Subsequently, the polyol was transferred again into the receiving container capable of being temperature-controlled and then pumped into the second container four times at 60° C. by means of the diaphragm piston pump through the jet disperser with a mass flux of 180/h.

Production of the Polyurethane Flexible Foam Materials

For a comparative series of tests, the following materials were employed:

Polyol A (Comparison)
Polyol B (Comparison)
Polyol C
TDI: isomer mixture of 2,4-toluylene diisocyanate and 2,6-toluylene diisocyanate in a ratio of 80:20, commercially available under the name DESMODUR ® T80 (Bayer AG, D-51368 Leverkusen)

-continued

| Catalyst 1: | bis(dimethylamino)ethyl ether |
|---|---|
| Silicone stabilizer 1: | TEGOSTAB ® BF 2370 (Th. Goldschmidt AG, D-45127 Essen) |
| Catalyst 2: | tin octoate catalyst, commercially available as DESMORAPID ® SO (Rheinchemie Rheina GmbH, D-68219 Mannheim) |

The following materials were used to produced a polyurethane flexible foam materials:

| Starting material | Amount [g] |
|---|---|
| Polyol A, B or C | 100.0 |
| water | 6.0 |
| Silicone stabilizer 1 | 0.6 |
| Catalyst 1 | 0.1 |
| Catalyst 2 | 0.15 |
| TDI | 73.4 |

Production Method

All the starting materials, except TDI, were mixed for 20 seconds by means of a high-speed stirrer. Subsequently, the TDI was added and the mixture was homogenized for 5 seconds by stirring. The frothing mixture was charged into an open, paper-lined mold with a base area measuring 27 cm×13 cm and, after the foaming operation, was stored for 30 minutes in a drying cabinet heated to 100° C. After cooling, the foam was cut open in the middle and assessed visually.

| Example No. | Polyol | Foam Assessment |
|---|---|---|
| 1 (Comparison) | A | fine and regular cell structure, fissure-free and collapse-free |
| 2 (Comparison) | B | coarse, irregular cell structure, partially collapsed |
| 3 | C | fine and regular cell structure, fissure-free and collapse-free |

As a result of the treatment according to the invention of the DMC-catalyzed polyol with the jet disperser, a product (Polyol C) was obtained which, in contrast to the untreated product (Polyol B), can be processed in a trouble-free manner to form a polyurethane flexible foam material and does not require extensive work-up like polyol A.

For a further, comparative series of tests, the following materials were employed:

| Polyol D (Comparison) | |
|---|---|
| Polyol E (Comparison) | |
| Polyol F | |
| Polyol G: | nominally trifunctional glycerine-initiated polyether polyol with a number-average molar mass of 4,800 g/mol with 10 wt. % of a polymeric filler, produced by in-situ conversion of 15 wt. % hydrazine and 85 wt. % of an isomer mixture of 80 wt. % 2,4-toluylene diisocyanate and 20 wt. % 2,6-toluylene diisocyanate |
| TDI: | isomer mixture of 2,4-toluylene diisocyanate and 2,6-toluylene diisocyanate in a ratio of |

-continued

| | 80:20 (DESMODUR ® T80 (Bayer AG, D-51 368 Leverkusen) |
|---|---|
| Silicone stabilizer 2: | TEGOSTAB ® B 8681 (Th. Goldschmidt AG, D-45127 Essen) |
| Catalyst 1: | bis(dimethylamino)ethyl ether |
| Catalyst 2: | tin octoate catalyst (DESMORAPID ® SO, Rheinchemie Rheina GmbH, D-68219 Mannheim) |
| Diethanolamine | |

The following materials were used to produce a polyurethane flexible foam material:

| Starting material | Amount [g] |
|---|---|
| Polyol D, E or F | 50.0 |
| Polyol G | 50.0 |
| water | 4.0 |
| Silicone stabilizer | 0.5 |
| Catalyst 1 | 0.1 |
| Catalyst 2 | 0.1 |
| diethanolamine | 1.0 |
| TDI | 47.8 |

Production Method

All the starting materials, except TDI, were mixed for 20 seconds by means of a high-speed stirrer. Subsequently, the TDI was added and the mixture was homogenized for 5 seconds by stirring. The frothing mixture was charged into an open, paper-lined mold with a base area measuring 27 cm×13 cm and, after the foaming operation, was stored for 30 minutes in a drying cabinet heated to 100° C. After cooling, the foam was cut open in the middle and assessed visually.

| Example No. | Polyol | Foam Assessment |
|---|---|---|
| 4 (Comparison) | D | fine cell structure, collapse-free |
| 5 (Comparison) | E | very coarse cell structure, partially collapsed |
| 6 | F | fine cell structure, collapse-free |

As a result of the treatment according to the invention of the DMC-catalyzed polyol with the jet disperser, a product (Polyol F) was obtained which, in contrast to the untreated product (Polyol E), can be processed in a trouble-free manner to form a polyurethane flexible foam material and does not require extensive work-up like polyol D.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the production of a polyether polyol by polyaddition of an alkylene oxide onto a starter compound containing active hydrogen atoms conducted in the presence of a double metal cyanide catalyst comprising conducting a reaction mixture comprising alkylene oxide and starter compound at least once through a zone which has an energy density of at least $5\times10^6$ J/m$^3$, wherein the dwell time of the reaction mixture in this zone is at least $10^{-6}$ seconds per pass.

2. The process according to claim 1, wherein the reaction mixture is guided through the high energy density zone 1 to 20 times.

3. The process according to claim 1, wherein the reaction mixture is guided through the high energy density zone no more than 1,000 times.

4. The process according to claim 1, wherein the energy density in the high energy density zone is at least $7.5 \times 10^6$ J/m$^3$.

5. The process according to claim 1, wherein the energy density in the high energy density zone is at least $10^7$ J/m$^3$.

6. The process according to claim 1, wherein the dwell time in the high energy density zone is from $10^{-5}$ to 1 second.

7. The process according to claim 1, wherein the reaction of at least 20 wt. %, based on the total amount of alkylene oxide used, of alkylene oxide is catalyzed by the double-metal cyanide catalyst.

8. A polyether polyol produced by the process of claim 1.

9. A polyurethane foam produced by reacting the polyether polyol of claim 8 with a polyisocyanate.

10. A process for the production of a polyether polyol by polyaddition of an alkylene oxide onto a starter compound containing active hydrogen atoms conducted partly in the presence of a double metal cyanide catalyst comprising conducting a reaction mixture comprising alkylene oxide and starter compound at least once through a zone which has an energy density of at least $5 \times 10^6$ J/m$^3$, wherein the dwell time of the reaction mixture in this zone is at least $10^{-6}$ seconds per pass.

11. A polyurethane foam produced by reacting the polyether polyol of claim 10 with a polyisocyanate.

* * * * *